United States Patent
Masteller et al.

[11] Patent Number: 5,501,747
[45] Date of Patent: Mar. 26, 1996

[54] HIGH STRENGTH IRON-COBALT-VANADIUM ALLOY ARTICLE

[75] Inventors: Millard S. Masteller, Fleetwood; Douglas W. Dietrich, Wernersville, both of Pa.

[73] Assignee: CRS Holdings, Inc., Wilmington, Del.

[21] Appl. No.: 440,532

[22] Filed: May 12, 1995

[51] Int. Cl.⁶ .......................... C22C 38/10; C22C 19/07
[52] U.S. Cl. ............................................ 148/311; 148/313
[58] Field of Search ..................................... 148/311, 313

[56] References Cited

U.S. PATENT DOCUMENTS

| | | |
|---|---|---|
| 2,691,306 | 10/1954 | Beams et al. |
| 3,634,072 | 1/1972 | Ackermann et al. |
| 4,116,727 | 9/1978 | Major. |
| 4,853,298 | 8/1989 | Harner et al. |
| 4,933,026 | 6/1990 | Rawlings et al. |
| 5,252,940 | 10/1995 | Tanaka .................................. 148/313 |

Primary Examiner—Deborah Yee
Attorney, Agent, or Firm—Dann, Dorfman, Herrell and Skillman

[57] ABSTRACT

A soft magnetic article is disclosed which is formed of an alloy consisting essentially of, in weight percent, about

| | |
|---|---|
| C | 0.003–0.02 |
| Mn | 0.10 max. |
| Si | 0.10 max. |
| P | 0.01 max. |
| S | 0.003 max. |
| Cr | 0.1 max. |
| Ni | 0.2 max. |
| Mo | 0.1 max. |
| Co | 48–50 |
| V | 1.8–2.2 |
| Nb | 0.15–0.5 |
| N | 0.004 max. |
| O | 0.006 max. | with the balance essentially iron. The article is annealed at a temperature of not more than 740° C. (1364° F.) for not more than about 4 hours and provides a room temperature yield strength of at least about 620 MPa (90 ksi) in the annealed condition. Among the disclosed embodiments of the annealed article according to this invention are a rotor and a stator for a rotating electrical machine such as a motor, generator, alternator or a magnetic bearing.

19 Claims, 3 Drawing Sheets

HIGH STRENGTH IRON-COBALT-VANADIUM ALLOY ARTICLE

FIELD OF THE INVENTION

The present invention relates to soft magnetic materials and in particular to an article formed of an iron-cobalt-vanadium alloy which in the annealed condition has a unique combination of yield strength, magnetic properties, and electrical properties.

BACKGROUND OF THE INVENTION

A ferromagnetic material that has little or no retentivity is said to be magnetically soft. When a magnetically soft material is magnetized in a magnetic field and then removed from that field, it loses most of the magnetism exhibited while in the field. A magnetically soft material is usually characterized by low hysteresis loss, a high magnetic permeability, and a high magnetic saturation induction. Magnetically soft materials are used in various static and rotating electrical devices, such as motors, generators, alternators, transformers, and magnetic bearings because of their desirable magnetic characteristics for such uses.

An iron-cobalt-vanadium alloy sold by Carpenter Technology Corporation under the trademark HIPERCO® Alloy 50 provides a very high saturation magnetization per unit weight of material. The nominal weight percent composition of the HIPERCO® Alloy 50 alloy is as follows.

|  | wt. % |
|---|---|
| Carbon | 0.01 |
| Manganese | 0.05 |
| Silicon | 0.05 |
| Cobalt | 48.75 |
| Vanadium | 1.90 |
| Niobium | 0.05 |
| Iron | Balance |

HIPERCO® Alloy 50 alloy has been used in rotor and stator laminations in electrical generators because its use results in a significant reduction in the weight of such devices. The magnetic and mechanical properties of the alloy are highly dependent on the grain size of the alloy, which, in turn, is dependent on the alloy's composition and how it is annealed, particularly the annealing temperature. The small amount of niobium present in the HIPERCO® Alloy 50 alloy aids grain refinement which benefits the strength of the alloy. When the alloy is annealed at the lowest practical temperature (i.e., about 720° C. (1328° F.)), it provides a yield strength of up to 448 MPa (65 ksi) together with adequate magnetic properties. While a yield strength of 448 MPa (65 ksi) has heretofore been adequate, electrical generators and magnetic bearings are being designed for operating speeds in excess of 50,000 rpm. At such speeds a yield strength significantly higher than 448 MPa (65 ksi) is required.

U.S. Pat. No. 4,933,026 (Rawlings et al.) relates to a soft magnetic alloy having the following composition in weight percent.

|  | wt. % |
|---|---|
| Carbon | 0.03 max. |
| Manganese | 0.3 max. |
| Silicon | 0.1 max. |
| Nickel | 0.3 max. |
| Cobalt | 33–55 |
| Vanadium | No positive addition |
| Tantalum + Niobium | 0.15–0.5 |
| Iron + Impurities | Balance |

The alloy described in the Rawlings et al. patent contains Ta and/or Nb in place of V for the alleged purpose of obtaining increased magnetic saturation induction. However, experience with the Rawlings et al. alloy has shown that the alloy has a relatively low electrical resistivity. Such low electrical resistivity results in undesirably high energy losses from eddy currents, as when the alloy is used in the rotor of a high speed generator which operates at very high flux reversal rates, e.g., about 5,000 Hz.

U.S. Pat. No. 3,634,072 (Ackermann et al.) relates to a magnetic alloy having the following composition in weight percent.

|  | wt. % |
|---|---|
| Carbon | 0.03 max. |
| Manganese | 0.8 max. |
| Silicon | 0.4 max. |
| Phosphorus | 0.02 max. |
| Sulphur | 0.02 max. |
| Chromium | 0.1 max. |
| Nickel | 0.8 max. |
| Molybdenum | 0.2 max. |
| Cobalt | 45–52 |
| Vanadium | 0.5–2.5 |
| Niobium | 0.02–0.5 |
| Zirconium | 0.07–0.3 |
| Iron | 45–52 |

The alloy described in the Ackermann et al. patent contains one or both of 0.02–0.5% niobium and 0.07–0.3% zirconium to improve ductility without adversely affecting the magnetic properties of the alloy. An important characteristic of that alloy is that it can withstand long periods in the grain-growth temperature range without undergoing a significant loss in ductility. The grain-growth temperature range extends from just above the order-disorder temperature to about the ferrite-austenite transformation temperature. Finished forms of the material described in Ackermann et al. are given a final annealing heat treatment in dry hydrogen at a temperature ranging from 760° to 843° C. (1400° to 1550° F.) for 4 hours. However, an article produced in accordance with Ackermann et al. does not have a yield strength sufficiently high to be useful in high rotating speed electrical devices such as the aforementioned aerospace generators and magnetic bearings.

In view of the foregoing, there is a need for an annealed article that has both high yield strength and good electrical and magnetic properties to meet the demands imposed by the significantly higher speeds of the newest generation of electrical generators and magnetic bearings.

SUMMARY OF THE INVENTION

The problems associated with the known soft magnetic materials are solved to a large degree by an article in accordance with the present invention. An article according to the present invention is a magnetic article formed of an iron-cobalt-vanadium alloy which in the annealed state has a unique combination of yield strength, magnetic properties, and electrical properties.

In accordance with one aspect of the present invention, there is provided a heat treated, magnetic article. The magnetic article of the present invention is formed of an alloy consisting essentially of, in weight percent, about

| | |
|---|---|
| C | 0.003–0.02 |
| Mn | 0.10 max. |
| Si | 0.10 max. |
| P | 0.01 max. |
| S | 0.003 max. |
| Cr | 0.1 max. |
| Ni | 0.2 max. |
| Mo | 0.1 max. |
| Co | 48–50 |
| V | 1.8–2.2 |
| Nb | 0.15–0.5 |
| N | 0.004 max. |
| O | 0.006 max. | with the balance being essentially iron. The article is annealed at a temperature of not more than about 740° C. (1364° F.) for not more than about 4 hours, and has a room temperature yield strength of at least about 620 MPa (90 ksi).

In accordance with another aspect of this invention, a magnetic bearing is provided. The magnetic bearing comprises a stator having a central opening and a rotor positioned within the central opening. The rotor comprises a generally disk-shaped core having a diameter sized to enable the disk-shaped core to be positioned within the central opening of the stator. The disk-shaped core is formed of the soft magnetic alloy set forth in the immediately preceding paragraph. The disk-shaped core is annealed at a temperature of not more than about 740° C. (1364° F.) for not more than about 4 hours, and has a room temperature yield strength of at least about 620 MPa (90 ksi).

In accordance with a further aspect of the present invention, a rotor for a rotating electrical machine is provided. The electrical machine comprises a stator having a central opening and a rotor positioned within the central opening. The rotor comprises a drum which is sized to enable the drum to be positioned within the central opening of the stator. The drum is formed in accordance with the article of the present invention.

Throughout this application, unless otherwise indicated, percent (%) means percent by weight.

BRIEF DESCRIPTION OF THE DRAWINGS

The foregoing summary, as well as the following detailed description of the preferred embodiments of the present invention will be better understood when read in conjunction with the accompanying drawings, in which.

DETAILED DESCRIPTION OF THE PREFERRED EMBODIMENTS

Figure 1:
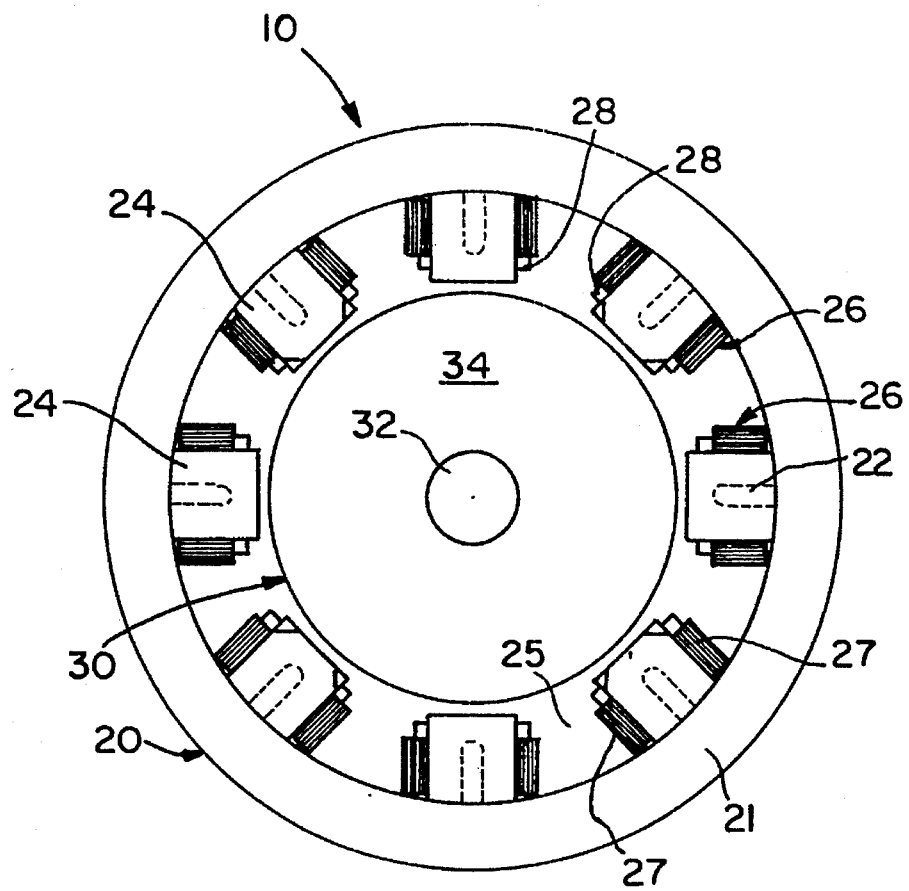
FIG. 1 is a schematic representation of a magnetic bearing in accordance with the present invention.

A high strength article in accordance with the present invention is formed of an iron-cobalt-vanadium alloy that contains an effective amount of niobium. At least about 0.15% niobium, better yet at least about 0.2% niobium is present in the alloy to benefit the yield strength such that the alloy provides a room temperature 0.2% offset yield strength of at least about 620 MPa (90 ksi) in the annealed condition. Niobium combines with some of the iron and/or cobalt to form Laves phase, $Nb(Fe,Co)_2$, particles which restrain grain growth when the alloy is annealed. A fine grain size, finer than about ASTM 10, is desired in the article according to this invention because yield strength increases with decreasing grain size. Although grain growth can be restricted by carbides and/or carbonitrides, we have found that the formation of Laves phase is more predictable since the formation of carbides and carbonitrides depends on the carbon content of the alloy which is difficult to control. Additionally, we have found that Laves phase particles are more structurally stable at elevated temperatures than carbides and carbonitrides. For those reasons, the $Nb(Fe,Co)_2$ Laves phase provides a more consistent and predictable response of the alloy to annealing heat treatments. Moreover, good structural stability is especially important when the alloy is to be hot worked.

At least about 0.2%, better yet about 0.3%, niobium in this alloy has been found to significantly broaden the range of annealing temperatures wherein a yield strength of at least about 620 MPa (90 ksi) can be obtained. Too much niobium in this alloy results in the formation of excessive amounts of Laves phase which forms brittle films at the grain boundaries resulting in cracking, especially during hot working. Accordingly, niobium is restricted to not more than about 0.5% and better yet to not more than about 0.4% in this alloy.

Persons skilled in the art will recognize that some or all of the niobium can be substituted with tantalum. When present, tantalum is substituted for niobium in a ratio of 1:1 based on atomic percents.

At least about 0.003% and better yet at least about 0.010% carbon is present in the alloy to form a small amount of carbides and/or carbonitrides which provide additional restriction on grain growth when the alloy is annealed. A lower amount of carbon does not materially benefit the magnetic properties of the alloy, so the additional expense of melting and refining the alloy to achieve lower carbon is not warranted. In this alloy carbon is restricted to not more than about 0.02%, preferably to not more than about 0.015%, in order to limit the formation of carbides and carbonitrides to amounts which do not adversely affect the structural stability of the alloy and its response to an annealing heat treatment.

At least about 48%, better yet at least about 48.5%, cobalt is present in the alloy to benefit the magnetic saturation induction. However, an excessive amount of cobalt adversely affects the magnetic saturation induction of the alloy, therefore cobalt is restricted to not more than about 50%, preferably to not more than about 49.0%. Preferably, cobalt content is present in an equal atomic ratio with iron.

At least about 1.8%, better yet at least about 1.9%, vanadium is present in the alloy to benefit its ductility. In addition, vanadium contributes to the good electrical resistivity provided by this alloy. High electrical resistivity is desired to minimize eddy current losses, which are the dominant loss mechanism in high speed generator rotors. Preferably, the amount of vanadium present in the alloy should be sufficient to provide a room temperature electrical resistivity of at least about 40 μΩ-cm. Too much vanadium in the alloy results in the precipitation of intermetallic compounds such as $FeCo_3V$ which magnetically harden the alloy. Therefore, vanadium is restricted to not more than about 2.2%, preferably to not more than about 2.1% in this alloy.

Additional elements may be present in controlled amounts to benefit other desirable properties provided by this alloy. For example, a small amount of manganese can be present in the alloy to benefit its hot workability. However, too much manganese adversely affects the magnetic saturation induction. Accordingly, when present, manganese is restricted to not more than about 0.10% in this alloy. Up to about 0.1% chromium can be present in the alloy to benefit the resistivity of the alloy.

The balance of the alloy is essentially iron apart from the usual impurities found in commercial grades of alloys intended for similar service or use. The levels of such elements are controlled so as not to adversely affect the desired properties. In this regard, not more than about 0.10% silicon is present in the alloy since too much silicon causes the formation of silicates, excessive quantities of which adversely affect the ductility of the alloy and the appearance of cold-rolled strip formed therefrom. Not more than about 0.01% phosphorus is present in the alloy because phosphorus impairs the magnetic properties and causes embrittlement of the alloy. Not more than about 0.003% sulphur is present in the alloy because sulphur adversely affects the hot workability of the alloy. Not more than about 0.2% nickel is present in the alloy because nickel lowers the gamma phase transformation temperature of the alloy. Because strain is created in the alloy when it is cooled from above the gamma phase transformation temperature, a reduction in the gamma phase transformation temperature unduly restricts the range of temperatures at which the alloy can be annealed without creating such strains. Not more than about 0.1% molybdenum is present in the alloy because molybdenum forms carbides. Although a limited amount of molybdenum carbides is beneficial to restrain grain growth, an excessive amount of such carbides is not desired in the present alloy, as discussed above. Not more than about 0.004% nitrogen is present in the alloy because nitrogen causes the formation of carbonitrides. Although a small amount of carbonitrides may be beneficial to restrict grain growth, an excessive amount is not desired in the present alloy. In addition, carbonitrides cause intergranular embrittlement of the alloy. Not more than about 0.006% oxygen is present in the alloy because oxygen causes the formation of vanadium-oxides which adversely affect the alloy's electrical resistivity and ductility.

The alloy used in the present invention is prepared, worked, and formed into products using conventional techniques. It can be melted in air as by means of an electric arc furnace or it can be melted using well-known vacuum melting techniques such as vacuum induction melting (VIM) and/or vacuum arc remelting (VAR). After being melted and cast as an ingot, it is forged into billets or slabs from a furnace temperature of about 1065°–1232° C. (1950°–2250° F.). After the usual surface preparation, it is hot rolled to strip, also from a furnace temperature of about 1065°–1232° C. (1950°–2250° F.), and formed into a coil while still hot. The strip is rapidly quenched in water to benefit the ductility of the alloy and then re-coiled. The thus-formed strip is an intermediate product substantially thicker than the finished size. The finished size is then formed by cold rolling the strip to the desired thickness or gauge.

An article in accordance with the present invention can be formed from laminations of strip or machined from forged billet or bar. Articles can also be formed by powder metallurgy techniques. Once the article is formed, it is annealed to provide the desired combination of strength, magnetic properties, and electrical properties that are characteristic of the article according to this invention. To obtain the unique combination of high yield strength, electrical and magnetic properties that are characteristic of the present invention, the annealing time and temperature are controlled so that the annealing temperature is relatively low and the annealing time is relatively short. As noted previously in this description, the presence of niobium in the alloy affects the range of useful annealing times and temperatures. As the niobium content increases, there is a broader range of times and temperatures at which the alloy can be annealed to achieve a yield strength of at least about 620 MPa (90 ksi). Preferably, the annealing temperature is restricted to not more than about 740° C. (1364° F.) and the annealing time is restricted to not more than about 4 hours, better yet to not more than about 2 hours. The annealing temperature is preferably at least about 720° C. (1328° F.), better yet at least about 730° C. (1346° F.), because it is difficult to control the recrystallization process in the alloy without heating it to at least the temperature of the ordering reaction, which occurs at about 720°–730° C. (1328°– 1346° F.) for the alloy used in accordance with the present invention. The article is cooled at a cooling rate of about 83° C. (150° F.) per hour. If desired, the annealing heat treatment can be carried out in a protective atmosphere, such as a vacuum, inert gas or non-oxidizing environment.

The article according to the present invention is well-suited for use in a wide range of articles requiring a combination of high yield strength and good soft magnetic properties. An article in accordance with the present invention is particularly well-suited for use in various static and rotating parts in high speed, rotating electrical devices, such as motors, generators, alternators and magnetic bearings. An article according to this invention can also be embodied as a magnetic core for a transformer, inductor, or the like.

Referring now to FIG. 1, there is shown an active magnetic bearing 10 in accordance with another aspect of the present invention. Magnetic bearings are generally known and one embodiment is described in U.S. Pat. No. 2,691,306 (Beams et al.), which is incorporated herein by reference. The magnetic bearing 10 comprises a stator 20 and a rotor 30. The stator 20 comprises a generally ring-shaped core 21 with a plurality of spokes 22 substantially equally spaced around the inner perimeter of the ring-shaped core 21. The spokes 22 project radially toward the center of the ring-shaped core 21. Winding supports 24 are positioned over the spokes 22 for the purpose of holding stator windings 26. Each stator winding 26 includes a drive coil 27 and a flux sense coil 28. The ring-shaped core 21 and winding supports 24 define a central opening 25 of the stator 20. The ring-shaped core 21 and winding supports 24 are assembled from solid forged stock such as billet or bar, or from laminations of strip material made in accordance with the present invention.

The rotor 30 is positioned within the central opening 25 of the stator 20. The rotor 30 comprises a shaft 32 and a disk-shaped core 34. The disk-shaped core 34 is assembled from a plurality of laminations of the high strength, soft magnetic alloy produced in accordance with the present invention. Each lamination consists of a thin ring whose outer diameter is sized to fit within the central opening 25 of the stator 20. The inner diameter of the ring is sized to frictionally fit around the shaft 32. The laminations are stacked to form the disk-shaped core 34 with a centrally located hole through which the shaft 32 can be inserted. Alternatively, the disk-shaped core 34 can be manufactured from solid forged stock of the alloy in accordance with the present invention.

Figure 2:
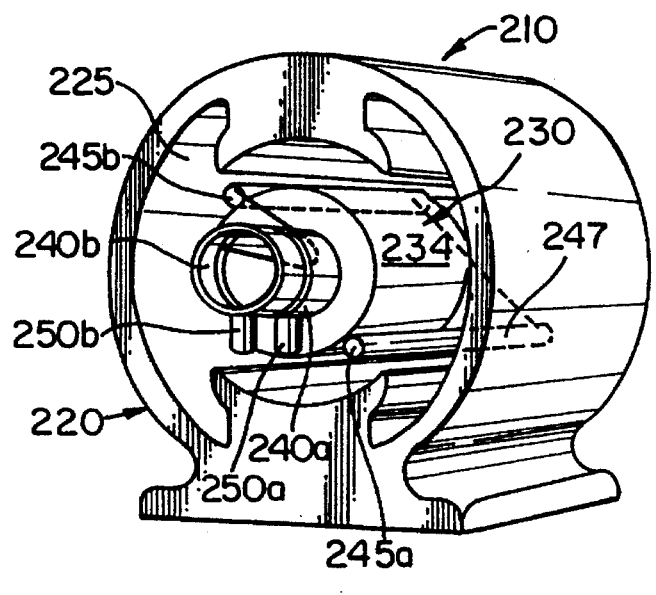
FIG. 2 is a front, right perspective view of an electric alternator in accordance with the present invention.

Referring now to FIG. 2, there is shown a single phase electric alternator 210 in accordance with a further aspect of the present invention. The alternator 210 comprises a stator 220 having a central opening 225. A rotor 230 is positioned within the central opening 225 of the stator 220. The rotor 230 includes a drum 234 that can be rotated. The drum 234 is assembled from a plurality of laminations of the high strength, soft magnetic alloy produced in accordance with the present invention. Alternatively, the drum 234 can be manufactured from solid forged stock of the alloy in accordance with the present invention. Two different conducting slip rings 240a and 240b are provided which are insulated from each other and which rotate together with the rotor 230. A first terminal 245a of a coil 247 is connected to the slip ring 240a and a second terminal 245b of the coil 247 is connected to the other slip ring 240b. Two stationary brushes 250a and 250b bear on the slip rings 240a and 240b respectively. Each brush 250 is always in contact with the same slip ring 240. Brushes 250a and 250b are connected to an external circuit (not shown) so that electric current generated by the alternator 210 can be conducted to a load.

EXAMPLES

In order to demonstrate the unique combination of yield strength and electrical and magnetic properties provided by an article according to the present invention, Examples 1–6 having the compositions in weight percent shown in Table 1 were prepared and tested. For comparison purposes, comparative Examples A–C with compositions outside the range of the present invention were also tested. Their weight percent compositions are also included in Table 1. Examples A and B are representative of the HIPERCO® Alloy 50 alloy. Example C is representative of the alloy disclosed in Rawlings et al.

Example C was obtained from an outside source in the form of 0.15 mm (0.006 inch) thick by about 20.3 cm (8 inch) wide strip. It is believed that the material used for Example C was prepared in a similar manner to that utilized for Examples 1–6, A, and B.

Samples of the 0.15 mm (0.006 inch) strip from Examples 1–6 and A–C were evaluated to determine mechanical and magnetic properties. Strip tensile specimens were formed from rectangular blanks of the strip which were milled to give 1.9 cm (0.75 inch) wide by 25.4 cm (10 inch) long rectangular pieces. The long axis of each rectangular piece coincides with the rolling axis of the strip. The width near the center of each rectangular piece was narrowed, for an approximately 6.4 cm (2.5 inch) length, to 1.28 cm (0.505 inches) by removing approximately 3.1 mm (0.122 inch) sections from each of the long sides of the rectangular pieces with a 1.3 cm (0.5 inch) radius milling tool. Ring laminations with a 3.8 cm (1.5 inch) O.D. and a 3.2 cm (1.25 inch) I.D. were also formed from the 0.15 mm (0.006 inch) thick strip. One group of tensile specimens and ring laminations was annealed in dry hydrogen at 720° C. (1328° F.) for 2 hours and another group at 760° C. (1400° F.) for 2 hours.

Figure 3:
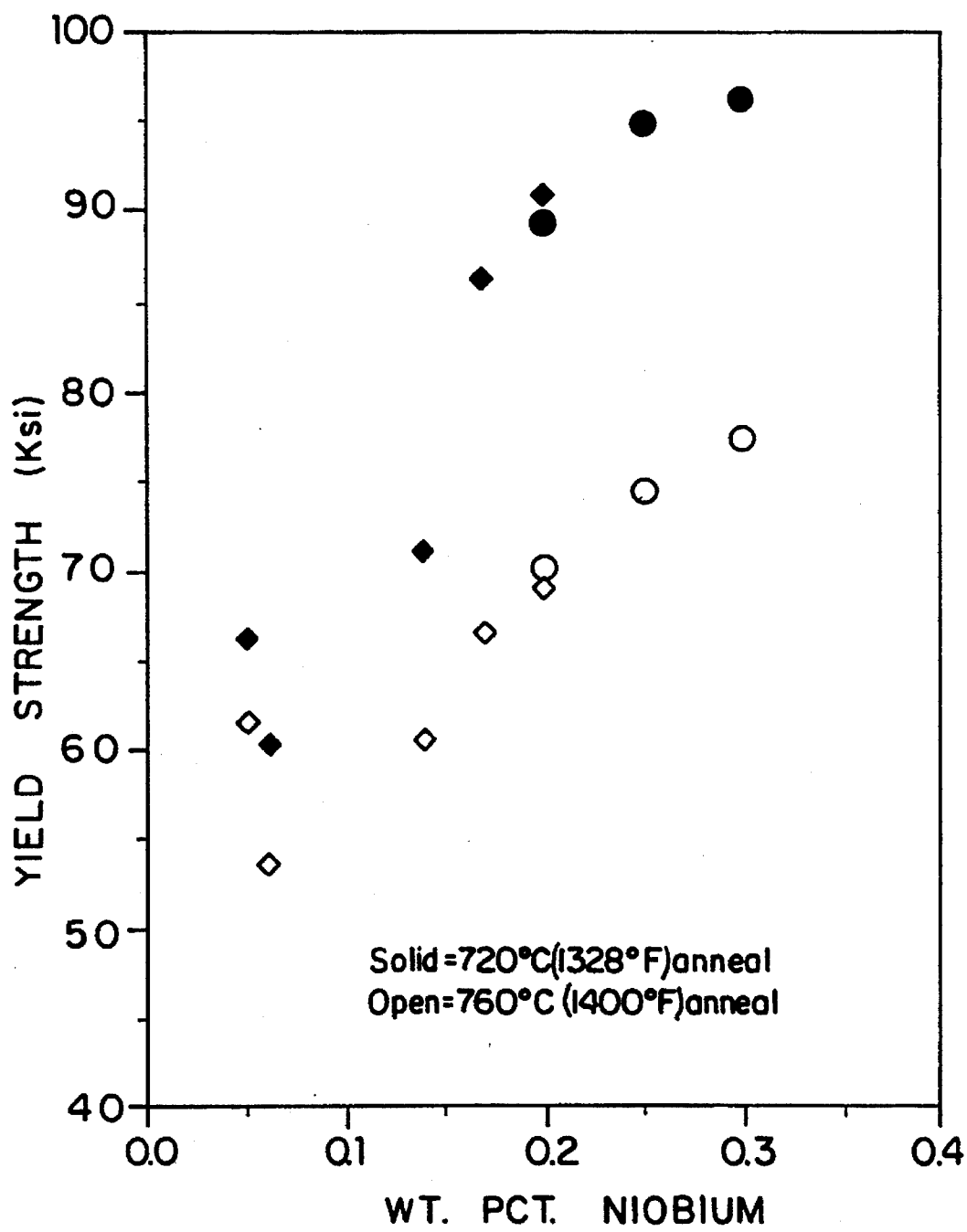
FIG. 3 is a graph of the room temperature 0.2% offset yield strength as a function of the weight percent niobium for several alloy compositions annealed at 720° C. (1328° F.) for 2 hours and 760° C. (1400° F.) for 2 hours.

Mechanical testing was conducted on the tensile specimens of Examples 1–6, A, B, and C using a horizontal tensile tester in which the tensile specimen is gripped and pulled horizontally along its longitudinal axis. The force and extension at which each specimen broke was measured and the room temperature 0.2% offset yield strength was determined. The yield strength determinations were made in duplicate and the average values of the two replicate measurements for specimens annealed at 720° C. (1328° F.) (solid symbols) and 760° C. (1400° F.) (open symbols), respectively, for 2 hours are shown in FIG. 3 and Table 2. For comparison purposes, the yield strength of Example C is included in Table 2.

TABLE 1

|    | Ex. 1 | Ex. 2 | Ex. 3 | Ex. 4 | Ex. 5 | Ex. 6 | Ex. A | Ex. B | Ex. C |
|----|-------|-------|-------|-------|-------|-------|-------|-------|-------|
| C  | .016  | .009  | .010  | .016  | .017  | .019  | .0065 | .0035 | .014  |
| Mn | <.01  | <.01  | <.01  | <.01  | <.01  | <.01  | .03   | .07   | .06   |
| Si | .01   | <.01  | <.01  | .01   | .01   | .01   | .03   | .03   | .07   |
| P  | <.005 | <.005 | <.005 | <.005 | <.005 | <.005 | —     | —     | —     |
| S  | .001  | .001  | .001  | .001  | <.001 | <.001 | .003  | .003  | .001  |
| Cr | .01   | .01   | .01   | <.01  | <.01  | .01   | .08   | .09   | .01   |
| Ni | .03   | .03   | .03   | .04   | .03   | .03   | .10   | .11   | .04   |
| Mo | .01   | <.01  | <.01  | <.01  | <.01  | .02   | <.01  | <.01  | <.01  |
| Co | 48.49 | 48.77 | 48.71 | 48.77 | 48.85 | 49.70 | 48.84 | 48.68 | 49.89 |
| V  | 1.86  | 1.88  | 1.87  | 1.86  | 1.89  | 1.89  | 1.98  | 1.94  | .27   |
| Nb | .14   | .17   | .20   | .20   | .25   | .30   | .05   | .06   | .11   |
| N  | .0024 | .0016 | .0021 | .0007 | .0007 | .0009 | .0014 | .0015 | .0016 |
| O  | .0026 | .0020 | .0027 | .0032 | .0044 | .0036 | .0021 | .0055 | .0088 |
| Ta | —     | —     | —     | —     | —     | —     | —     | —     | .27   |
| Fe | Bal   | Bal   | Bal   | Bal   | Bal   | Bal   | 48.86 | 49.06 | 49.26 |

Examples 1–6 and comparative Examples A and B were prepared from 181 kg (400 lb.) heats which were vacuum induction melted and cast into 19.0 cm (7.5 inch) square ingots. The ingots were hot pressed on a 5.08×10$^5$ kg (500 ton) press to 11.4 cm (4.5 inch) by 18.4 cm (7.25 inch) slab billets from a temperature of 1177° C. (2150° F.) and then slow cooled. The billets were hot rolled from a temperature of 1090°–1200° C. (1994°–2192° F.) to 2.0 mm (0.08 inch) thick strip and coiled. The coils were heated to 820° C. (1508° F.) and rapidly cooled to preserve an atomically disordered state. The strip was recoiled, blasted with metallic shot, and cleaned in acid to remove surface oxides. The coils were then cold rolled to 0.15 mm (0.006 inch) thick by about 15.2 mm (6 inch) wide and de-greased. Comparative

TABLE 2

| | | Yield Strength, MPa (ksi) | |
|---|---|---|---|
| Example | % Nb | 720° C. (1328° F.) Anneal | 760° C. (1400° F.) Anneal |
| 1 | 0.14 | 489 (70.9) | 416 (60.4) |
| 2 | 0.17 | 603 (87.4) | 457 (66.3) |
| 3 | 0.20 | 643 (93.3) | 467 (67.8) |
| 4 | 0.20 | 615 (89.2) | 483 (70.0) |
| 5 | 0.25 | 653 (94.7) | 512 (74.3) |
| 6 | 0.30 | 663 (96.1) | 533 (77.3) |
| A | 0.05 | 455 (66.0) | 423 (61.4) |

TABLE 2-continued

| | | Yield Strength, MPa (ksi) | |
|---|---|---|---|
| Example | % Nb | 720° C. (1328° F.) Anneal | 760° C. (1400° F.) Anneal |
| B | 0.06 | 415 (60.2) | 368 (53.4) |
| C | 0.11 | 744 (108) | 624 (90.5) |

The data in FIG. 3 and Table 2 clearly show a significant increase in the yield strength for the examples containing 0.15% or more niobium when annealed at 720° C. (1328° F.) for 2 hours. As shown in FIG. 3, although the yield strength generally increases with increasing niobium content for a given annealing time and temperature, the specimens containing 0.15% or more niobium provide substantially higher yield strength when annealed at 720° C. (1328° F.) compared to the specimens annealed at 760° C. (1400° F.). More particularly, the data presented in FIG. 3 show that a yield strength of about 620 MPa (90 ksi) is readily obtained by specimens containing more than about 0.15% niobium when the article is annealed at a temperature of 720° C. (1328° F.), in accordance with the present invention.

The core losses were determined for Examples 4–6 annealed at 720° C. (1328° F.) and 760° C. (1400° F.), respectively, for 2 hours. Core loss was measured at a flux density of 20 kG and at test frequencies ranging from 60 to 4000 Hz on the annealed ring laminations. The core loss was determined using the ASTM Standard Procedure A927/A927M (Standard Test Method for Alternating-Current Magnetic Properties of Toroidal Core Specimens Using the Voltmeter-Ammeter-Wattmeter Method). The results are converted to energy loss by dividing the core loss by the test frequency. The energy loss values are shown in Table 3 and plotted in FIG. 4. Also shown in Table 3 and FIG. 4, for comparison purposes, are the results of core loss testing for Example B annealed at 760° C. (1400° F.) for 2 hours and specimens of Example C annealed at 720° C. (1328° F.) and 760° C. (1400° F.), respectively, for 2 hours. Since the data presented in FIG. 4 for each alloy at each annealing temperature is very close to being linear, a line representing the result of a linear regression fit through each set of data is included in FIG. 4 so that the results may be compared easily. The slope of the line reflects the contribution of eddy currents and therefore electrical resistivity. A high slope is indicative of low electrical resistivity.

TABLE 3

| | Anneal | Energy Loss (J/kg/cycle) | | | | | |
|---|---|---|---|---|---|---|---|
| Ex. | Temp. (°C.) | 60 Hz | 100 Hz | 400 Hz | 1200 Hz | 2400 Hz | 4000 HZ |
| 4 | 720 | .345 | .340 | .344 | .380 | .435 | .505 |
| | 760 | .202 | .205 | .209 | .255 | .312 | .384 |
| 5 | 720 | .364 | .370 | .379 | .413 | .468 | .541 |
| | 760 | .232 | .231 | .241 | .277 | .335 | .408 |
| 6 | 720 | .400 | .403 | .407 | .443 | .500 | .562 |
| | 760 | .270 | .269 | .281 | .320 | .370 | .440 |
| B | 760 | .087 | — | .096 | .143 | .202 | .285 |
| C | 720 | .419 | — | .449 | .599 | .771 | .992 |
| | 760 | .264 | — | .307 | .457 | .638 | .843 |

Figure 4:
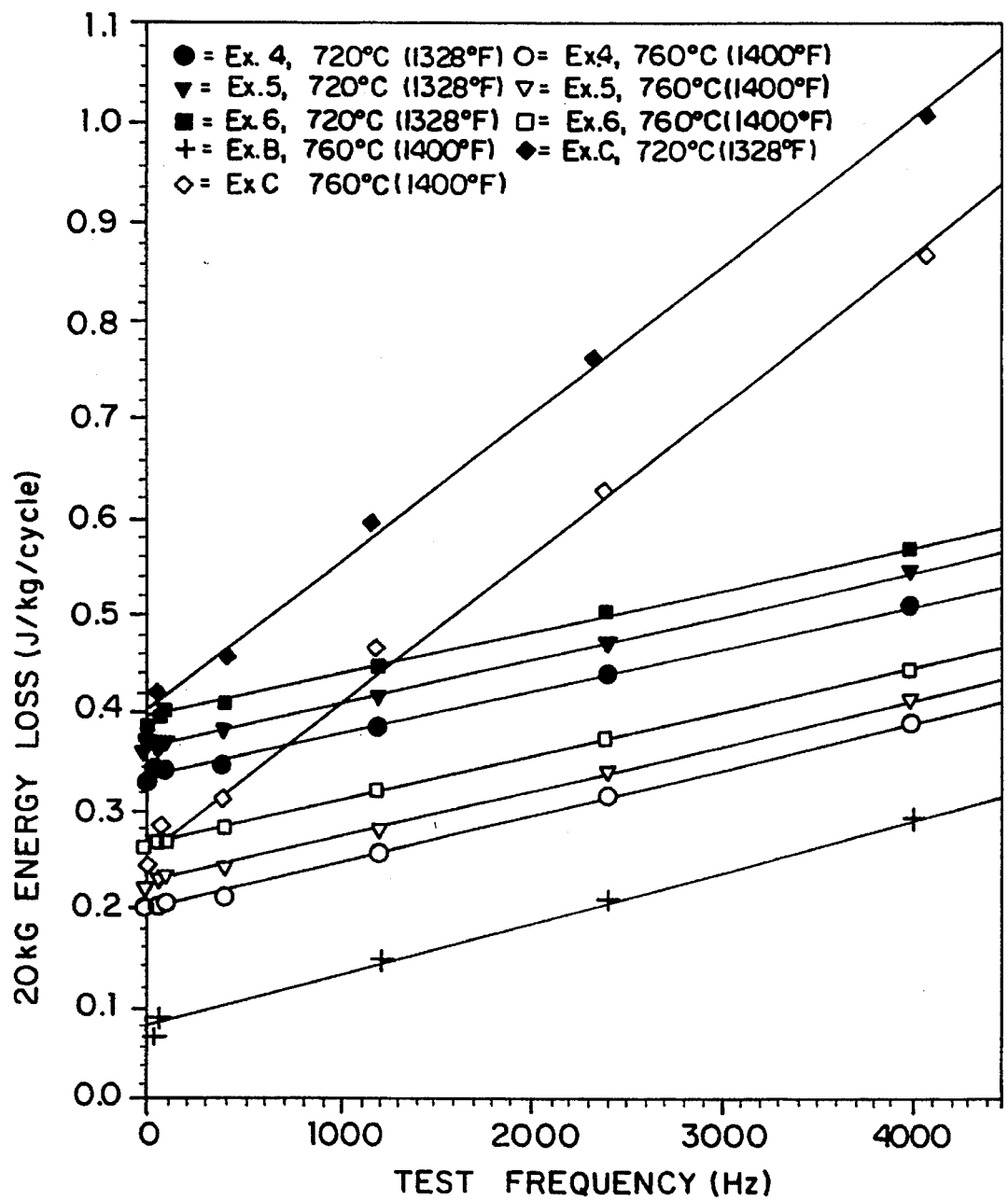
FIG. 4 is a graph of the 20 kG energy loss as a function of the test frequency for various combinations of alloy composition and annealing temperature.

The data presented in FIG. 4 shows that Examples 4–6 in accordance with the present invention behave similarly to Example B in regard to core loss as a function of test frequency, although the measured core losses for Examples 4–6 at each test frequency are generally somewhat higher than those of Example B at the same frequency.

The data presented in FIG. 4 further show that compared to Example C, Examples 4–6 of the present invention provide a marked improvement in core loss as the test frequency increases. That improvement is irrespective of the annealing time and temperature used. A low core loss at frequencies between 4,000 and 5,000 Hz is needed for use in state-of-the-art high speed electrical generators and magnetic bearings.

Shown in Table 4 are the room temperature resistivities for Examples 4–6 after annealing at 760° C. (1400° F.) for 2 hours. Electrical resistivity is known to be virtually independent of annealing temperature. Accordingly, it is expected that the resistivity values shown in Table 4 would be achieved by the same specimens annealed at any temperature in accordance with the present invention. All three examples had resistivities greater than 40 µΩ-cm, which is desirable to minimize eddy current losses. By way of comparison, the HIPERCO® Alloy 50 alloy (Examples A and B) is known to have an electrical resistivity of about 44 µΩ-cm and the Rawlings et al. alloy (Example C) has a resistivity of about 14 µΩ-cm, as shown in Table 4.

TABLE 4

| | % Nb | Resistivity (µΩ-cm) |
|---|---|---|
| Ex. 4 | 0.20 | 41.9 |
| Ex. 5 | 0.25 | 41.2 |
| Ex. 6 | 0.30 | 41.9 |
| Ex. A | 0.05 | 44 |
| Ex. B | 0.06 | 44 |
| Ex. C | 0.11 | 14 |

In summary, Examples 4–6 have significantly higher yield strengths as compared to Example B. Furthermore, although Examples 4–6 have somewhat larger core losses relative to Example B, they have significantly better core loss relative to Example C. Moreover, Examples 4–6 have about the same electrical resistivity of the known HIPERCO® Alloy 50 alloy and significantly better resistivity than the niobium containing Fe-Co-V alloy represented by Example C. Hence, the data presented in FIGS. 3 and 4 and in Tables 2–4 show the unique combination of yield strength, magnetic properties, and electrical properties provided by an article in accordance with the present invention compared to the known soft magnetic materials.

The terms and expressions that have been employed herein are used as terms of description and not of limitation. There is no intention in the use of such terms and expressions to exclude any equivalents of the features described or any portions thereof. It is recognized, however, that various modifications are possible within the scope of the invention claimed.

What is claimed is:

1. A magnetic article formed of an alloy consisting essentially of, in weight percent, about

| | |
|---|---|
| C | 0.003–0.02 |
| Mn | 0.10 max. |
| Si | 0.10 max. |
| P | 0.01 max. |
| S | 0.003 max. |
| Cr | 0.1 max. |
| Ni | 0.2 max. |
| Mo | 0.1 max. |
| Co | 48–50 |
| V | 1.8–2.2 |
| Nb | 0.15–0.5 |
| N | 0.004 max. |
| O | 0.006 max. | and the balance essentially iron, said article having been annealed at a temperature of not more than 740° C. (1364° F.) for not more than about 4 hours, and said article having a room temperature yield strength of at least about 620 MPa (90 ksi).

2. The article in accordance with claim 1 which contains at least about 0.25% niobium.

3. The article in accordance with claim 1 which contains at least about 0.3% niobium.

4. The article in accordance with claim 1 which has been annealed for not more than about 2 hours.

5. The article in accordance with claim 1 which has been annealed at a temperature of at least about 720° C. (1328° F.).

6. A magnetic bearing comprising:
   a. a stator having a central opening therein; and
   b. a rotor positioned within the central opening of the stator, said rotor comprising a generally disk-shaped core having a diameter sized to enable the disk-shaped core to be positioned within the central opening of said stator, said disk-shaped core being formed of an alloy consisting essentially of, in weight percent, about

| | |
|---|---|
| C | 0.003–0.02 |
| Mn | 0.10 max. |
| Si | 0.10 max. |
| P | 0.01 max. |
| S | 0.003 max. |
| Cr | 0.1 max. |
| Ni | 0.2 max. |
| Mo | 0.1 max. |
| Co | 48–50 |
| V | 1.8–2.2 |
| Nb | 0.15–0.5 |
| N | 0.004 max. |
| O | 0.006 max. | and the balance essentially iron, said disk-shaped core having been annealed at a temperature of not more than 740° C. (1364° F.) for not more than about 4 hours, and said disk-shaped core having a room temperature yield strength of at least about 620 MPa (90 ksi).

7. The magnetic bearing in accordance with claim 6 wherein the stator comprises:
   a. a generally ring-shaped core having an inner perimeter;
   b. a plurality of radially directed spokes substantially equally spaced around the inner perimeter of the ring-shaped core, and projecting inwardly of the ring-shaped core; and
   c. a plurality of winding supports each positioned over one of the radially directed spokes.

8. The magnetic bearing in accordance with claim 6 wherein the rotor comprises a shaft extending axially through the disk-shaped core.

9. The magnetic bearing in accordance with claim 6 wherein the disk-shaped core is formed of a plurality of laminations, each lamination being generally ring-shaped and having an inner diameter dimensioned to receive a shaft therethrough.

10. The magnetic bearing in accordance with claim 6 wherein the alloy contains at least about 0.25% niobium.

11. The magnetic bearing in accordance with claim 6 wherein the alloy contains at least about 0.3% niobium.

12. The magnetic bearing in accordance with claim 6 wherein the disk-shaped core has been annealed for not more than about 2 hours.

13. The magnetic bearing in accordance with claim 6 wherein the disk-shaped core has been annealed at a temperature of at least about 720° C. (1328° F.).

14. A rotor for a rotating electrical machine comprising a drum sized to enable the drum to be positioned within a central opening of a stator, said drum being formed of an alloy consisting essentially of, in weight percent, about

| | |
|---|---|
| C | 0.003–0.02 |
| Mn | 0.10 max. |
| Si | 0.10 max. |
| P | 0.01 max. |
| S | 0.003 max. |
| Cr | 0.1 max. |
| Ni | 0.2 max. |
| Mo | 0.1 max. |
| Co | 48–50 |
| V | 1.8–2.2 |
| Nb | 0.15–0.5 |
| N | 0.004 max. |
| O | 0.006 max. | and the balance essentially iron, said drum having been annealed at a temperature of not more than 740° C. (1364° F.) for not more than about 4 hours, and said drum having a room temperature yield strength of at least about 620 MPa (90 ksi).

15. The rotor in accordance with claim 14 wherein the drum is formed of a plurality of laminations.

16. The rotor in accordance with claim 14 wherein the alloy contains at least about 0.25% niobium.

17. The rotor in accordance with claim 14 wherein the alloy contains at least about 0.3% niobium.

18. The rotor in accordance with claim 14 wherein the drum has been annealed for not more than about 2 hours.

19. The rotor in accordance with claim 18 wherein the drum has been annealed at a temperature of at least about 720° C. (1328° F.).

* * * * *